Feb. 1, 1944. R. E. MEEKER 2,340,837
PIEZO CRYSTAL TESTING DEVICE
Filed Nov. 30, 1942 2 Sheets-Sheet 1

INVENTOR.
Richard E. Meeker
BY
ATTORNEY.

Feb. 1, 1944.   R. E. MEEKER   2,340,837
PIEZO CRYSTAL TESTING DEVICE
Filed Nov. 30, 1942   2 Sheets-Sheet 2

INVENTOR.
Richard E. Meeker
BY Thos. E. Scofield
ATTORNEY.

Patented Feb. 1, 1944

2,340,837

UNITED STATES PATENT OFFICE 2,340,837

PIEZO CRYSTAL TESTING DEVICE

Richard E. Meeker, Kansas City, Mo., assignor to Temperature Engineering Corporation, Kansas City, Mo., a corporation of Missouri Application November 30, 1942, Serial No. 467,431

5 Claims. (Cl. 171—327)

This invention relates to improvements in testing devices for piezo electric crystals or resonators, and refers more particularly to a heavily insulated cabinet equipped with a temperature control mechanism for maintaining a wide range of temperatures therein.

Among the important objects is the provision of an insulated cabinet whose interior atmosphere can be changed over a wide range of temperatures, and the temperature of the atmosphere kept relatively uniform throughout the cabinet.

Another object of the invention is the provision of a holder within the cabinet capable of supporting a large number of the piezo crystals, and electric connections by which electric circuits through the crystals can be made from the outside of the cabinet.

The cabinet also provides an indexing mechanism whereby the operator or individual performing the tests can at any time during the testing period identify the individual crystal being tested.

Other objects and advantages of my invention will be apparent during the course of the following description.

In the accompanying drawings, which form part of the instant specification and are to be read in conjunction therewith, and in which like reference numerals are used to indicate like parts in the various views, Fig. 1 is a plan view of the test cabinet with the parts broken away showing the interior mechanism and insulated walls.

Figure 1:
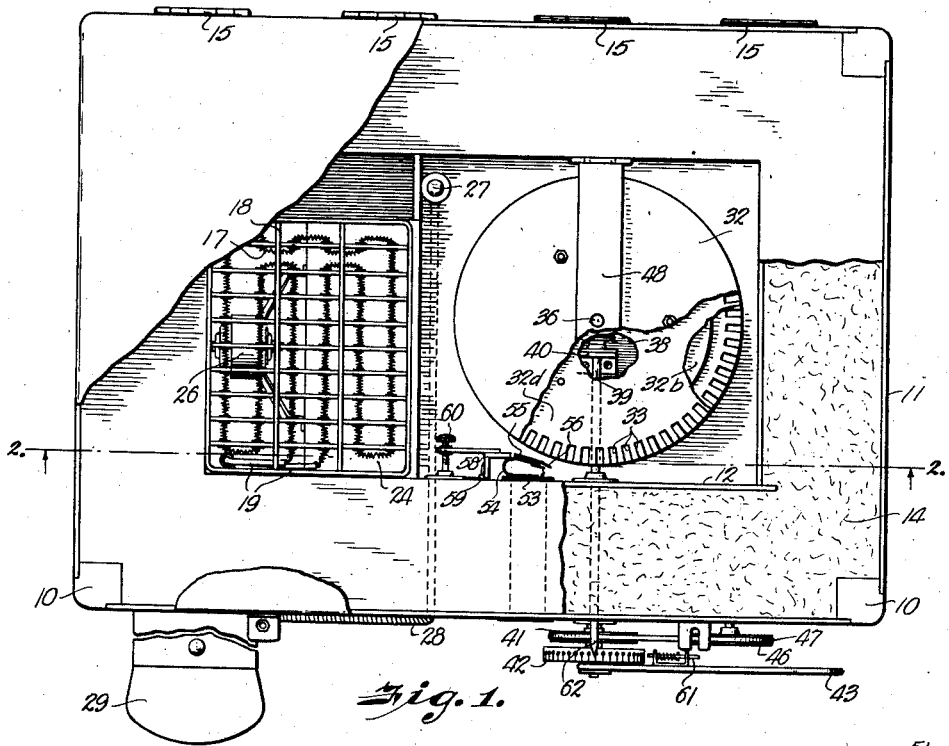

With the extensive use of piezo electric crystals in connection with radio circuits for tanks, planes and trucks, and other modes of transportation in war work, the necessity for a device which will test the activity and frequency accuracy of such crystals has arisen.

In the testing of these piezo electric quartz crystals it has been found advisable to conduct the tests throughout a wide range of temperatures. In some instances temperatures as low as —30° F. and as high as 130° F., as well as at intervening temperatures. To do this it was necessary to devise a testing device in which could be tested a large number of crystals simultaneously, while the atmosphere within the testing device was accurately controlled at the different testing temperatures required.

It was also necessary to develop a satisfactory device by means of which an electric circuit could be connected with the individual crystals during the testing thereof, and an indexing mechanism whereby each crystal could be definitely identified during the testing thereof.

Referring to the drawings, the testing device consists of an insulated cabinet mounted on suitable supports 10. The cabinet proper comprises an outside metallic or tempered hardwood casing 11, and inner lining 12, which are mounted on suitable supports 13. Between the inner and outer linings is a wide space filled with insulation, shown at 14. The cabinet is closed at the top by means of a heavily insulated cover hinged at 15, and constructed of the metal or tempered hardwood casing 11 which surrounds the insulation 14. Between the top of the cabinet and the cover are gaskets 16, which assure a pressure tight fit between the cover and top of the cabinet.

The insulation shown at 14 may be of any suitable type effective to maintain the testing space within the cabinet relatively unaffected by external atmospheric conditions. Spun glass or fibrous insulations as used in building construction or refrigeration have proved satisfactory.

Figure 2:
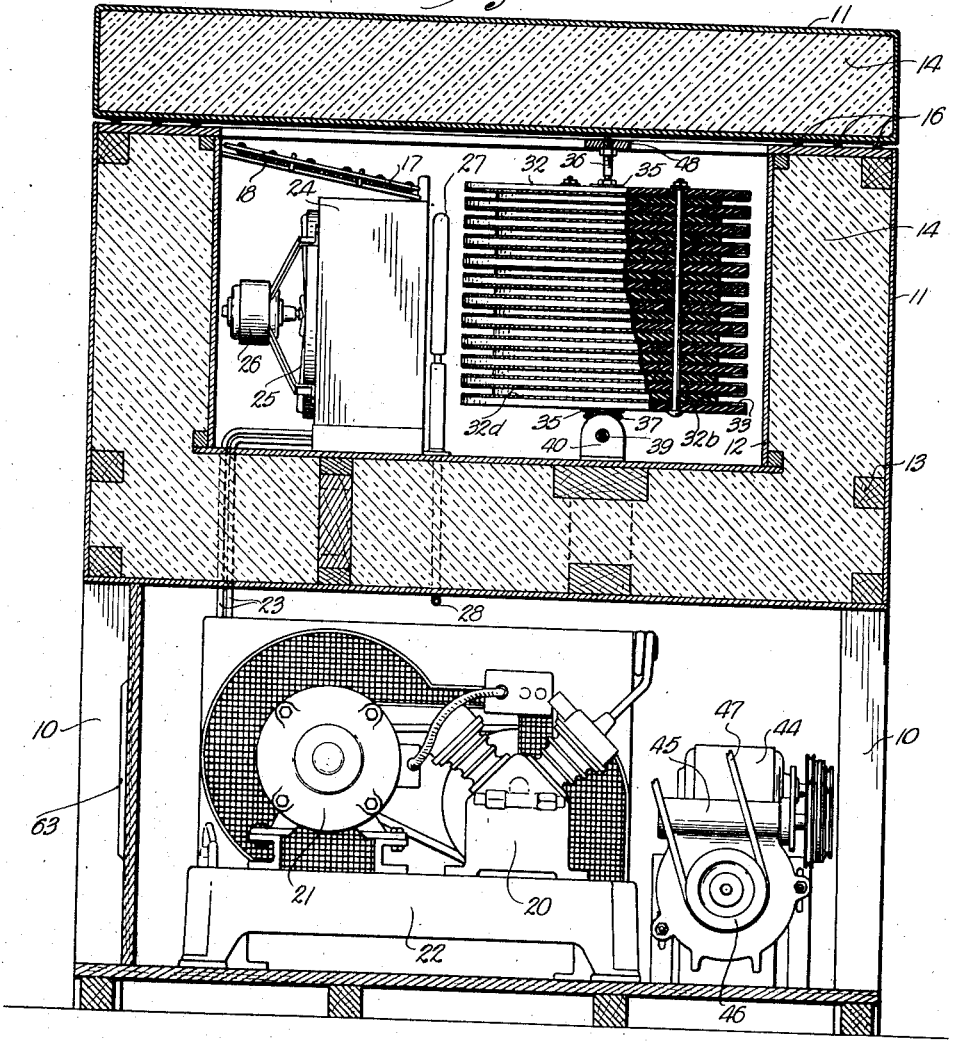
Fig. 2 is a side elevational view partly in section taken along the line 2—2, Fig. 1, in the direction of the arrows.

To heat the enclosure within the test cabinet there is provided an electrical resistance coil 17 supported between grids 18, as shown in Figs. 1 and 2. Electrical connections 19 are connected both to the resistance coil and to an electrical circuit outside of the cabinet to supply heat to the enclosure. In this circuit is interposed the thermostatic control, hereinafter explained.

To cool the enclosure a refrigeration unit is mounted beneath the cabinet with the cooling or refrigeration coil of the unit positioned within the cabinet.

In brief, the refrigeration unit consists of a compressor 20, driven by a motor 21, mounted upon a base 22. The refrigerant compressed in the unit is circulated through pipes 23 to and from a cooling coil mounted behind the partition 24, shown in Fig. 2, of the test cabinet.

Supported adjacent the cooling coil and the heating unit is a circulating fan 25 driven by motor 26, likewise furnished with electric power from a source outside the cabinet.

A sensitive feeler bulb 27 connected into a thermostat circuit 28 of the remote type having a recorder 29 on the outside of the cabinet, registers accurately the temperature of the atmosphere within the test cabinet.

The particular heating and cooling mechanism for controlling the temperature of the atmosphere within the test cabinet is more or less arbitrary, it being essential only that an accurate control and a uniformity of the temperature be maintained throughout the space within which the testing is being done.

Figure 3:
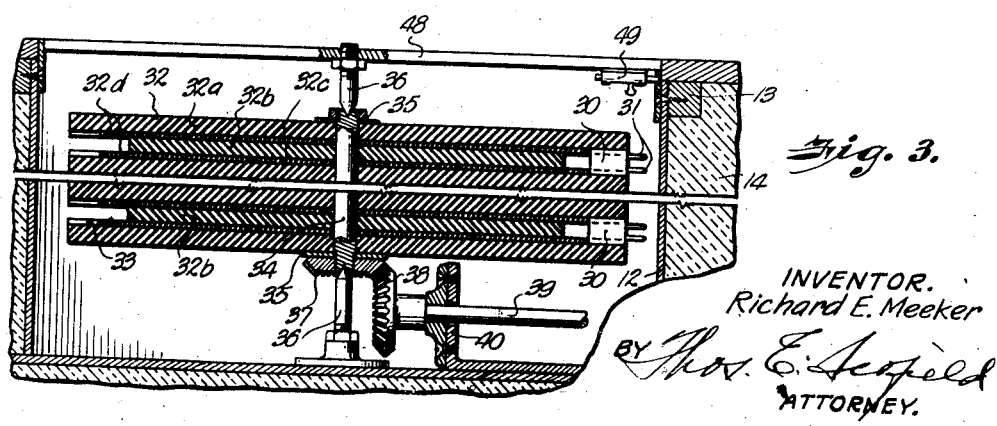
Fig. 3 is an enlarged sectional view showing the crystal holder and its vertical support.

The piezo crystals to be tested are mounted in plastic enclosures, as shown at 30 in Fig. 3. Electric terminals 31 serve as a means for connecting the crystals into the radio circuit in which they are employed and also as terminals for connection to the test circuit.

The holder for the crystals during testing consists of a plurality of discs 32 made up of upper, intermediate and lower layers of the same thickness, the intermediate layer separated from the upper and lower layers by two thin layers of wood or other insulating material. The construction of the discs is probably best shown in Fig. 3, and for convenience the upper layer has been designated by the numeral 32a, the intermediate layer as 32b, and the lower layer as 32c. This construction has been found advisable due to the wide range in temperatures maintained in the cabinet and the tendency of the discs to warp and get out of shape.

The intermediate layer 32b is of somewhat smaller diameter than the upper and lower layers 32a and 32c. The two thin layers 32d are notched as shown at 33 in Fig. 1, the notches being of the same width as the plastic casings 30 surrounding the quartz crystals.

The distance between the upper layer 32a and lower layer 32c, as spaced by the intermediate layers 32b and thin layers 32d, corresponds to the depth of the casing 30 which holds the crystals. Consequently the notches are of a size which will offer a space which will closely fit the crystal casings.

A plurality of the discs 32 are mounted upon a vertical shaft 34, and held in place on the shaft between upper and lower flanges 35. The shaft is pivoted above and below upon bearing members 36. The upper bearing member is mounted on a bearing support bar, hereinafter described in connection with the removal of the holder from the cabinet. The lower bearing member is supported upon a pedestal in the floor of the enclosure.

On the lower extremity of the shaft 34 is a beveled gear 37, which meshes with a similar gear 38 mounted upon a horizontal shaft 39 carried by a bearing support 40. This shaft extends through the wall of the cabinet and upon the shaft outside of the cabinet is mounted a pulley 41, an index wheel 42 and a manually operable handle 43, as shown in Fig. 1. The shaft is driven by a motor 44 mounted beneath the cabinet adjacent the refrigerating unit shown in Fig. 2.

The speed of the motor 44 is reduced through a worm and reduction gear shown at 45, power being transmitted from the reduction gear shaft through pulley 46 and belt 47 to pulley 41. The speed of the reduction motor is reduced so that the crystal holding discs 32 rotate with the shaft 34 at a rate of approximately one revolution per minute.

The testing devices which have been constructed and put in use have had crystal holding discs eighteen inches in diameter with sixty slots or notches around the circumference of each disc for the crystals. Ten tiers of discs have been mounted on the shaft, so that the holder would accommodate six hundred crystals for testing. To insert or remove the crystals in the pockets or notches provided in the discs, the cover of the cabinet is swung back on its hinges and the bearing support bar 48 carrying the upper bearing 36 is released by means of the latch 49, and the support bar and upper bearing removed. The disc holders mounted upon shaft 34 can then be lifted out of the cabinet and the crystals either inserted or removed from the pockets in the discs.

Figures 6, 7:
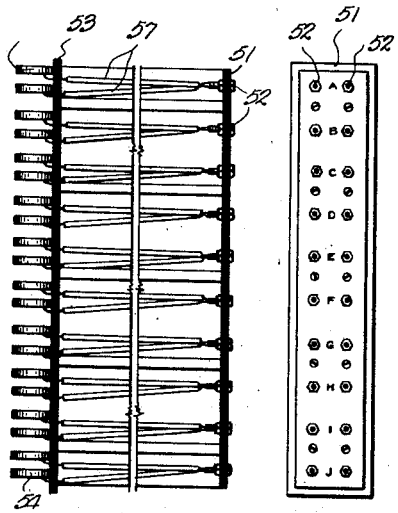
Fig. 6 is a side view of the electric connections by means of which connection is made with the crystals being tested and with the exterior testing circuit.
Fig. 7 is a front elevational view of the panel on the exterior of the cabinet shown in cross section in Fig. 6.

The mechanism for testing the individual crystals will now be explained. It is shown in Figs. 4, 5, 6 and 7 of the drawings. In one side of the cabinet, preferably in alignment with the vertical shaft 34, is a slot 50 through the insulation of the cabinet. On the outside of the cabinet covering this slot is a panel 51, and on this panel are mounted electrical connections 52 lettered from A to J, as shown in Fig. 7.

Inside of the cabinet on the panel 53 are mounted springs 54, which correspond in number with the terminals 52 on the outside panel. Mounted on the individual springs 54 are insulated strips 55. At the end of each of these strips is a metal contact 56. These metal contacts are connected to the terminals 52 on the outside panel by wires 57.

Figure 4:
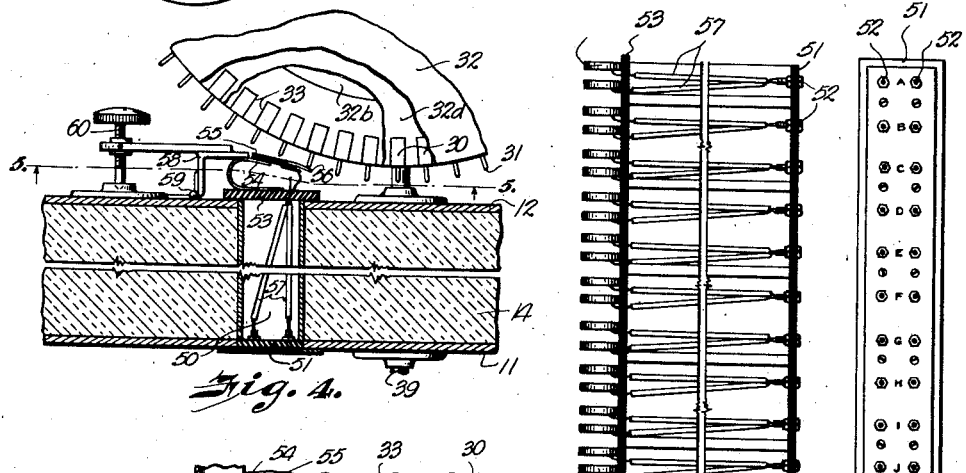
Fig. 4 is an enlarged view of the mechanism by which the individual crystal terminals are connected with the exterior testing circuit.
Figure 5:
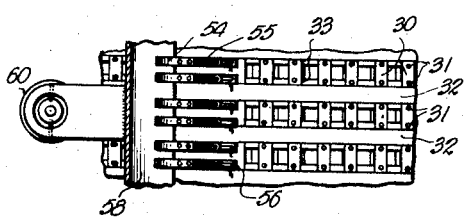
Fig. 5 is a view taken along the line 5—5, Fig. 4, in the direction of the arrows.

In order to control the tension imposed on the springs 54 and position the contacts 56 accurately with relation to terminals 31 of the crystals, and facilitate removal of the crystal holding discs, an angle bar 58 is hinged at 59 behind the springs, the edge of the angle contacting the top curvature of the springs, as shown in Fig. 4. To raise and lower the position of the angle 58 and the position of springs 54, which in turn position the contact points 56 with relation to the terminals 31 of the crystals, a thumb screw 60 is provided. The mechanism is such that the two terminals of the individual crystals in the separate tiers or discs will wipe against the contact points 56, completing the circuit through wires 57 with the terminals 52 on the outside panel. By means of jacks inserted into the terminals 52 a test circuit is made with one crystal on each disc. By rotating the disc all of the crystals arranged around the circumference of the discs in the separate tiers are contacted individually and can be individually tested.

To accurately ascertain which tier of crystals is in alignment with the testing circuit, an indexing mechanism is used. This mechanism consists of a wheel 42 mounted upon the portion of the shaft 39 extending outside the cabinet and shown in Fig. 1. The rim of this wheel is perforated with the same number of holes as there are pockets in the discs for holding the crystals. A spring latch mechanism 61 is insertable into any one of the holes on the rim, holding the shaft in position while a pointer 62 at the top of the index wheel designates the particular crystal being tested.

Thus the indexing mechanism just explained designates the location of the crystal around the circumference of the disc, while the lettering on the panel 51 denotes the position of the crystal on the vertical tier being tested.

Suitable switches or electrical controls for starting and stopping the crystal holder, the refrigeration and heating units and the motor 26 driving the circulating fan, are located on a control panel 63 mounted in a convenient place on one of the end walls surrounding the refrigerating unit and drive mechanism.

Test temperatures ranging from −50° F. to 200° F. are feasible with the equipment shown.

The layers which make up the discs numbered 32a, 32b, 32c and 32d, may be made either of laminated wood or suitable plastic material in order to prevent distortion or warping with the temperature changes to which the discs are subjected.

While it is not shown in the drawings, it is contemplated that the enclosure may be equipped with a tube or pipe to which is connected a vacuum pump, and subatmospheric pressures maintained upon the cabinet to simulate stratosphere conditions. With this attachment the crystals could be tested under high vacuum at the same time that they are being tested through the wide range of temperature conditions.

In actual testing the movement of the rotating disc holders 32 may be effected manually by the arm or handle 43 or by power from the motor 44.

In actual practice a control is attached to the motor whereby the rotation of the disc may be regulated at any desired rate. In testing for activity, the holder may be rotated somewhat more rapidly than when testing for frequency. This speed control for the motor is not shown in the drawings as it is a conventional mechanism operated with a foot treadle and forms no part of the present invention except as used in the combination.

It will be seen that I have accomplished the objects of my invention by a construction in which a wide range of test temperatures may be accurately maintained and the atmosphere within the enclosure uniformly held at a variety of temperatures during the testing operation. Furthermore, a large number of crystals may be tested in the cabinet during a single test period, and the individual crystals separately tested and their characteristics accurately determined.

It will be understood that certain features and sub-combinations are of utility and may be employed without reference to other features and sub-combinations. This is contemplated by and is within the scope of my claims. It is further obvious that various changes may be made in details within the scope of my claims without departure from the spirit of my invention. It is, therefore, to be understood that my invention is not to be limited to the specific details shown and described.

Having thus described my invention, I claim:

1. In a crystal testing device the combination with an insulated enclosure of heating and refrigeration elements in said enclosure, control means for said heating and refrigeration elements, a holder for the crystals in said enclosure including a disc having a plurality of apertures in its circumference for reception of the individual crystals, and electrical connections for testing the individual crystals from the exterior of the enclosure while controlled temperature conditions are being maintained therein.

2. In a crystal testing device the combination with an insulated enclosure of heating and refrigeration elements in said enclosure, control means for said heating and refrigeration elements, a holder for the crystals in said enclosure including a rotating disc having a plurality of apertures in its circumference for reception of the individual crystals, and electrical connections for testing the individual crystals from the exterior of the enclosure while controlled temperature conditions are being maintained therein.

3. In a crystal testing device the combination with an insulated enclosure, heating and refrigeration elements in said enclosure, control means for said heating and refrigeration elements, a holder for the crystals in said enclosure including a rotating disc having a plurality of apertures in its circumference for the reception of the individual crystals, corresponding electrical connections to the crystals and affixed to the interior of the enclosure adapted to register and contact with the rotation of the disc and permit testing of the crystals from the exterior of the enclosure.

4. In a crystal testing device the combination with an insulated enclosure, heating and refrigeration elements in said enclosure, control means for said heating and refrigeration elements, a holder for the crystals in said enclosure including a rotating disc having a plurality of apertures in its circumference for the reception of the individual crystals, corresponding electrical connections to the crystals and affixed to the interior of the enclosure adapted to register and contact with the rotation of the disc and permit testing of the crystals from the exterior of the enclosure, corresponding indices inside and outside the enclosure identifying throughout the test period the individual crystal being tested.

5. In a crystal testing device the combination with an insulated enclosure, heating and refrigeration elements in said enclosure, control means for said heating and refrigeration elements, a holder for the crystals in said enclosure including a plurality of discs rotating upon a common axis, said discs having a plurality of apertures in their circumferences for reception of the individual crystals, corresponding electrical connections to the crystals and affixed to the interior of the enclosure adapted to register and contact with the rotation of the discs and permit testing of the crystals from the exterior of the enclosure.

RICHARD E. MEEKER.